Patented Aug. 8, 1950

2,518,249

UNITED STATES PATENT OFFICE 2,518,249

DIPHENYL-4,4'-DI(SULFONYL AZIDE)

John B. Ott, Dayton, Ohio, assignor to Monsanto Chemical Company, St. Louis, Mo., a corporation of Delaware No Drawing. Application July 9, 1949,
Serial No. 103,962

3 Claims. (Cl. 260—349)

This invention relates to a new chemical compound. More particularly, the invention relates to diphenyl-4,4'-di(sulfonyl azide).

Diphenyl-4,4'-di(sulfonyl azide) is a new compound which is relatively stable at normal temperatures and which may be decomposed under controlled conditions at 140–150° C.

One object of this invention is to provide a relatively stable diazide.

Another object of this invention is to provide a diphenyl-4,4'-di(sulfonyl azide).

These and other objects are attained by preparing diphenyl-4,4'-di(sulfonyl azide) in substantially pure form.

The following examples are given in illustration and are not intended as limitations on the scope of this invention. Where parts are mentioned they are parts by weight.

Diphenyl-4,4'-di(sulfonyl azide) has the following structural formula:

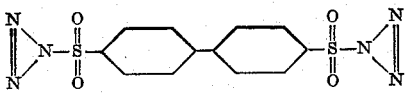

One method of preparing the new compound is to react diphenyl with chlorosulfonic acid and then to react the product with an inorganic azide such as sodium azide.

Example I

A mixture of 256 parts of diphenyl and 1150 parts of chlorosulfonic acid was allowed to stand for 3 to 4 hours at 20 to 25° C. The reaction mixture was then poured into a mixture of ice and water to precipitate the product. The precipitate was separated from the water by filtration and was purified by washing it with water. The product was identified by analysis as diphenyl-4,4'-di(sulfonyl chloride). 35 parts of the purified product were added to a solution of 13 parts of sodium azide in water. The solution was maintained at 25 to 30° C. for about 2½ hours accompanied by vigorous agitation. The temperature of the solution was then raised to 45 to 50° C. and agitation was continued for about 1 hour. The product was an aqueous emulsion which was resolved by the addition of acetone. A white precipitate was formed which was recovered by filtration and purified by washing with water.

The final product was a white solid which decomposed at 144 to 145° C. when an attempt to determine its melting point was made. Analysis of the product proved it to be substantially pure diphenyl-4,4'-di(sulfonyl azide).

This method of producing diphenyl-4,4'-di(sulfonyl azide) may be substantially varied. Other agents such as sulfuryl chloride may be used to prepare the sulfonyl chloride intermediate. The reaction producing the intermediate may be carried out at temperatures ranging from 10 to 40° C. Below 10° C., substantially no reaction occurs over a commercially feasible period of time. Above 40° C., large amounts of undesirable by-products are formed. At least 2 mols of chlorosulfonic acid must be used per mol of diphenyl. An excess of the acid may be used, the excess being removed prior to reaction with the inorganic azide.

The reaction of the di(sulfonyl chloride) with the inorganic azide may be carried out at temperatures ranging from 15 to 100° C. If fairly stable azides such as alkaline earth metal azides are used, the reaction may be carried out initially at temperatures from 20 to 40° C. followed by raising the temperature to 40 to 60° C. If unstable azides such as the copper azides are used, the temperature of the reaction should be carefully maintained at from 15 to 40° C. If stable azides such as alkali metal azides, lead azide, thallium azide, etc. are used, the temperature, particularly in the finishing step, may be raised to about 100° C. to shorten the duration of the reaction. Azides of nearly all of the metallic elements are known and may be used in the process of this invention. For purposes of economy, it is preferred to use the relatively stable and easily obtained sodium azide. The amount of azide used, based on 1 mol of the di(sulfonyl chloride), should be at least 2 equivalents based on the azide ring. Thus, at least 2 mols of sodium azide must be used whereas 1 mol of lead azide ($PbN_6$) may be used. An excess of azide may be employed with the excess being removed during the purification of the final product.

Diphenyl-4,4'-di(sulfonyl azide) is particularly valuable as a foaming and cross-linking agent for thermoplastic materials. It is stable at temperatures up to about 140° C. Between 140 and 150° C. the compound may be decomposed under controlled conditions without danger of a runaway reaction.

Example II

Plasticized acetone-soluble cellulose acetate containing 77 parts of diethyl phthalate per 100 parts of cellulose acetate was mixed with 4% by weight of diphenyl-4,4'-di(sulfonyl azide). The mixture was malaxated on milling rolls at about 120° C. to produce an opaque sheet. No decomposition of the azide was observed. The sheet was then heated in an open mold at 140° C. for several hours. The product was brittle foam of low density which was insoluble in acetone.

It is obvious that variations may be made in the process for preparing and purifying the diphenyl-4,4'-di(sulfonyl azide).

What is claimed is:

1. Diphenyl-4,4'-di(sulfonyl azide).

2. A process for preparing diphenyl-4,4'-di-(sulfonyl azide) which comprises reacting 1 mol of diphenyl with 2 mols of chlorosulfonic acid at 10 to 40° C. and then reacting at 15 to 100° C. 1 mol of the product with 2 equivalents based on the azide ring of an inorganic azide.

3. A process as in claim 2 wherein the inorganic azide is sodium azide.

JOHN B. OTT.

No references cited.